United States Patent [19]

Orsborn et al.

[11] Patent Number: 5,048,273
[45] Date of Patent: Sep. 17, 1991

[54] METHOD AND APPARATUS FOR CONTROLLING OPERATION OF AN AGRICULTURAL IMPLEMENT

[75] Inventors: Jesse H. Orsborn, Hinsdale; George M. Butkovich, Lemont; Thomas K. Bessman, Frankfort; John F. Link, Calumet City, all of Ill.

[73] Assignee: J. I. Case Company, Racine, Wis.

[21] Appl. No.: 628,209

[22] Filed: Dec. 14, 1990

Related U.S. Application Data

[63] Continuation-in-part of Ser. No. 553,894, Jul. 16, 1990, abandoned.

[51] Int. Cl.⁵ .............................................. A01D 46/08
[52] U.S. Cl. ........................................ 56/10.2; 56/28; 56/DIG. 7; 56/DIG. 15
[58] Field of Search ............... 56/10.2, 12.8, 16.4, 56/28, 30, DIG. 7, DIG. 15

[56] References Cited

U.S. PATENT DOCUMENTS

| | | | |
|---|---|---|---|
| 4,332,127 | 6/1982 | Staiert et al. | 56/10.2 |
| 4,458,471 | 7/1984 | Herwig | 56/10.2 |
| 4,466,230 | 8/1984 | Osselaere et al. | 56/10.2 |
| 4,744,207 | 5/1988 | Hanley et al. | 56/16.6 |
| 4,759,185 | 7/1988 | McConnell et al. | 56/10.2 |
| 4,896,491 | 1/1990 | Warnsholz et al. | 56/28 |
| 4,969,318 | 11/1990 | Hudson et al. | 56/10.2 |

*Primary Examiner*—Terry L. Melius
*Attorney, Agent, or Firm*—Dressler, Goldsmith, Shore, Sutker & Milnamow, Ltd.

[57] ABSTRACT

A method and apparatus for controlling operation of an agricultural implement such as a cotton harvester. The control system includes operator presence circuitry, gear selector circuitry, and bypass circuitry arranged independently of each other for controlling operation of a drive assembly such as a hydrostatic drive mechanism used to drive a harvesting unit on and propel the cotton harvester.

17 Claims, 2 Drawing Sheets

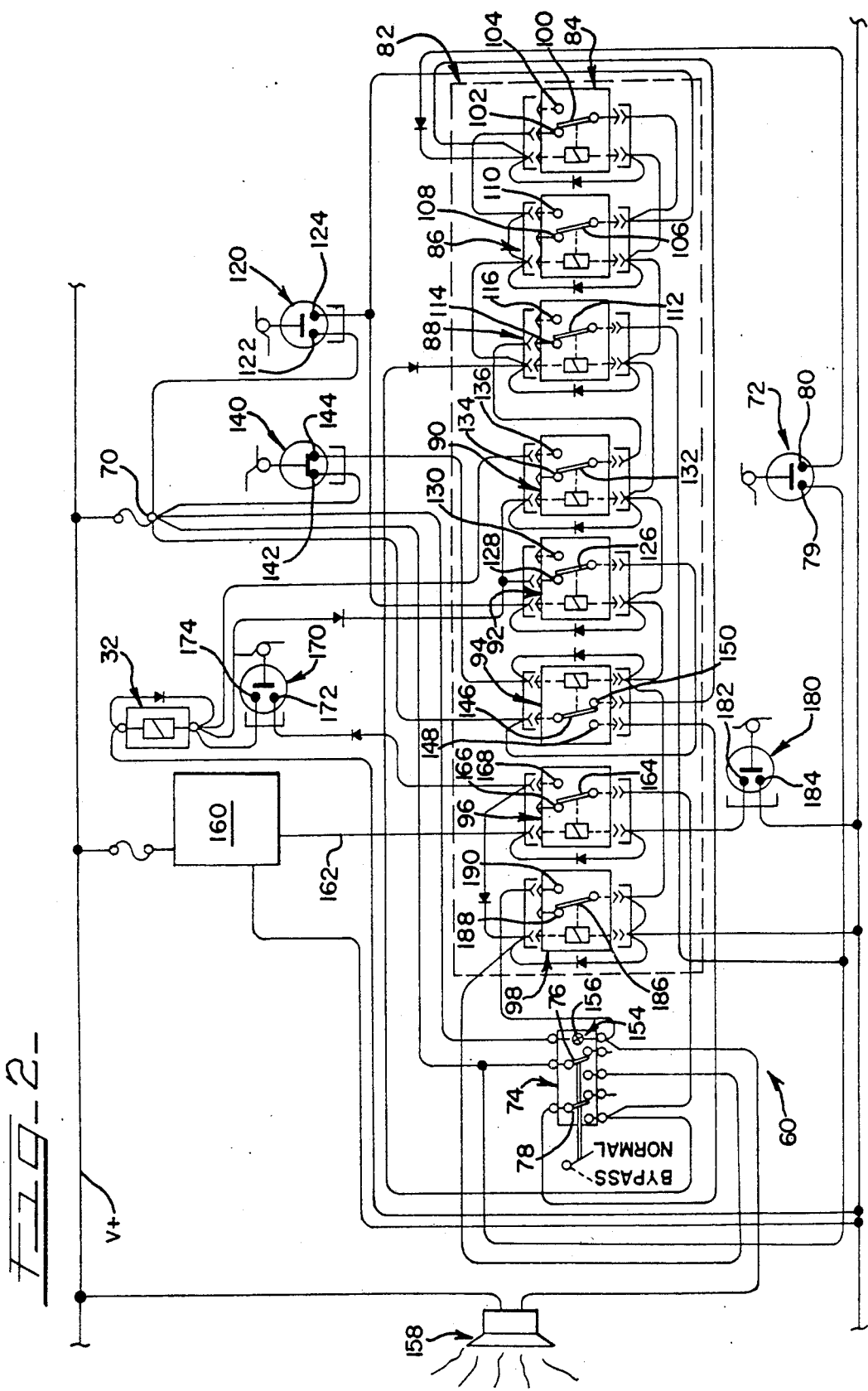

METHOD AND APPARATUS FOR CONTROLLING OPERATION OF AN AGRICULTURAL IMPLEMENT

RELATED APPLICATIONS

This application is a continuation-in-part of co-assigned and co-pending U.S. Pat. application Ser. No. 07/553,894 filed Jul. 16, 1990, now abandoned.

FIELD OF THE INVENTION

The present invention generally relates to agricultural implements and, more particularly, to a method and apparatus for controlling operation of a harvesting unit on a cotton harvester.

BACKGROUND OF THE INVENTION

Agricultural implements such as cotton harvesters and the like include a series of different mechanisms which are driven by an engine and remotely controlled from an operator station on the harvester. A conventional cotton harvester includes a series of harvesting units which are connected in a side-by-side relation to each other at a forward end of a frame of the cotton harvester.

In a preferred form, each harvesting unit includes a harvesting mechanism typically comprised of a pair of circularly driven picker rotor assemblies. Each rotor assembly includes a plurality of radially extending picker spindles which remove the cotton from the plants as the harvester is driven across the field.

As preventive maintenance and to reduce costly down time, the harvesting mechanism of each harvesting unit is regularly serviced and inspected. There are times when it is beneficial to run the picker rotor assemblies slowly during servicing and/or inspection of the harvesting unit. To inhibit exposure of a user of a self-propelled cotton harvester to the circularly driven picker rotor assemblies, an operator presence system, including a seat switch, is sometimes utilized. In such a system, power to the harvesting unit is normally interrupted upon the operator leaving the seat at the operator station.

Some operator presence systems actually stop the engine when the operator moves from a presselected position. Other known systems provide a short delay after the operator leaves the operator station before power to the harvesting unit is interrupted or terminated.

During a harvesting operation, the harvesting units are located forwardly and below the operator station of the cotton harvester. Accordingly, the operator oftentimes raises off the seat to observe the performance of the harvesting units. The absence of the operator from the seat usually results in unwanted and annoying stoppage of the harvester. Stoppage of the harvester is not only annoying, but is oftentimes unexpected adding to the operator's frustration. Reliability of an operator presence system is also of concern in various operating conditions.

SUMMARY OF THE PRESENT INVENTION

In view of the above, and in accordance with the present invention, there is provided an improved method and apparatus for controlling operation of an agricultural implement such as a cotton harvester provided with an operator station and a plurality of harvesting units. The control system of the present invention preferably includes an operator presence circuitry, gear selector circuitry, and bypass circuitry arranged in parallel relation with each other. The control system circuitry of the present invention enables operation of the harvesting units as long as the harvester is conditioned for movement across a field notwithstanding the presence of an operator at the operator station or when the operator is seated at the operator station and the harvester is conditioned in a neutral mode of operation. The control system circuitry of the present invention furthermore allows the harvesting units to be enabled remote from the operator station as long as the harvester is operated in response to predetermined conditions.

The cotton harvester has a mobile frame which mounts a drive train. The drive train includes an engine, a hydrostatic drive mechanism, and a transmission. During operation of the harvester, the engine is operated at different speeds. The output of the engine is connected to the hydrostatic drive mechanism which drives the transmission, thereby imparting movement to the harvester, and the harvesting units. The hydrostatic drive mechanism is selectively operated in engaged or disengaged modes, dependent upon the position of an operable control member located at the operator station which controls operation of a servovalve. The transmission is conditioned for operation in a neutral mode or a drive mode dependent upon the position of a drive control member located at the operator station.

The operator presence circuitry of the control system effects operation of the harvesting unit independently of the remaining circuits in the control system. In the preferred embodiment, the operator presence circuitry enables operation of or powers the servovalve of the hydrostatic drive mechanism thereby enabling operation of the harvesting unit when the operator is present at the operator station notwithstanding the condition of the transmission. On the other hand, the operator presence circuitry is responsive to the operator being away from the operator station and interrupts power to the servovalve thereby disabling operation of the harvesting units when the operator leaves the operator station and the transmission is conditioned in a neutral mode.

The gear selector circuitry is arranged in parallel or independent relation with the operator presence circuitry. The gear selector circuitry is responsive to the condition of the transmission. The gear selector circuitry powers the servovalve thereby enabling operation of the harvester units as long as the transmission is conditioned in other than a neutral mode and notwithstanding the operator being away from the operator station.

The bypass circuitry is arranged in parallel or independent relation with the operator presence circuitry and the gear selector circuitry. The bypass circuitry allows controlled operation of the harvesting units from a location remote from the operator station as long as the drive train has been conditioned into a neutral mode, and the engine is operated within a predetermined range of speeds.

The control system enables operation of the hydrostatic drive mechanism such that when the operator control member is positioned to engage the hydrostatic drive mechanism and the transmission is conditioned in a drive mode, the harvesting units will be enabled although the operator presence circuitry senses the operator is away from the operator station. The control system disables the hydrostatic drive mechanism from operating the harvesting units when the transmission is conditioned in a neutral mode and the operator is away from the operator station except as provided for under the influence of the bypass circuitry.

Following an interruption in power to the servovalve resulting from the operator leaving the operator station while the transmission is in neutral or otherwise, the control system of the present invention is configured to require a form of positive or intentional action on the part of the operator to avoid inadvertent operation of the harvester and harvesting units. The control system of the present invention is preferably configured to require the operator to move the operable control member controlling the hydrostatic drive mechanism to a disengaged position following any interruption in power to the servovalve of the hydrostatic drive mechanism.

In the disclosed embodiment, a manually operated emergency brake is provided on the harvester. The operation of the emergency brake is monitored by an emergency brake switch forming part of the bypass circuitry. The emergency brake switch must provide a signal that the emergency brake is applied before the harvesting units will be enabled under the influence of the bypass circuitry.

During inspection and servicing of the harvesting units, it is preferable to operate the harvesting units at a relatively low speed. The control system of the present invention further includes an apparatus for limiting operation of the harvesting units under the control of the bypass circuitry to a predetermined range of engine speeds which are preferably in a lower speed range of operation.

The present invention is also directed to a method for controlling a cotton harvester of the type described above. The steps involved with the preferred method of controlling the harvester include: monitoring when the operator is away from the operator station; monitoring the position of the drive control member; and controlling operation of the hydrostatic drive mechanism as a function of the monitoring steps such that when the drive control member is positioned to operate the drive train in a drive mode, the hydrostatic drive mechanism will be enabled although the operator is away from the operator station and will be disabled when the drive control member is shifted into a neutral mode of operation.

In addition to those steps described above, the method for operating the harvester may further include the step of operating the harvesting unit from a location remote from the operator station. The method for controlling the harvester may further include the step of enabling operation of the harvesting units from a location remote from the operator station as long as the engine is operated within a predetermined range of speeds. Moreover, the method for controlling operation of the harvester may further include the step of inhibiting continued operation of the harvester following disablement of the hydrostatic drive mechanism until the operator positively acts to condition the harvester for continued operation.

Notably, the control system of the present invention does not rely on the expiration of a short delay prior the power being terminated to the harvesting unit. As long as the harvester is engaged in a drive mode, the operator is free to shift positions within the operator station or to raise from the seat to observe the performance of the harvesting units. The ability to inspect and service the harvesting units from an area remote from the operator station and operate the harvesting units at a relatively slow engine speed is also beneficial.

Numerous other features and advantages of the present invention will become readily apparent from the following detailed description, the accompanying drawings, and the appended claims.

BRIEF DESCRIPTION OF THE DRAWINGS

FIG. 2 is a schematic representation of a control system used in combination with the cotton harvester for controlling operation of the harvesting unit.

DETAILED DESCRIPTION OF THE PRESENT INVENTION

Figure 1:
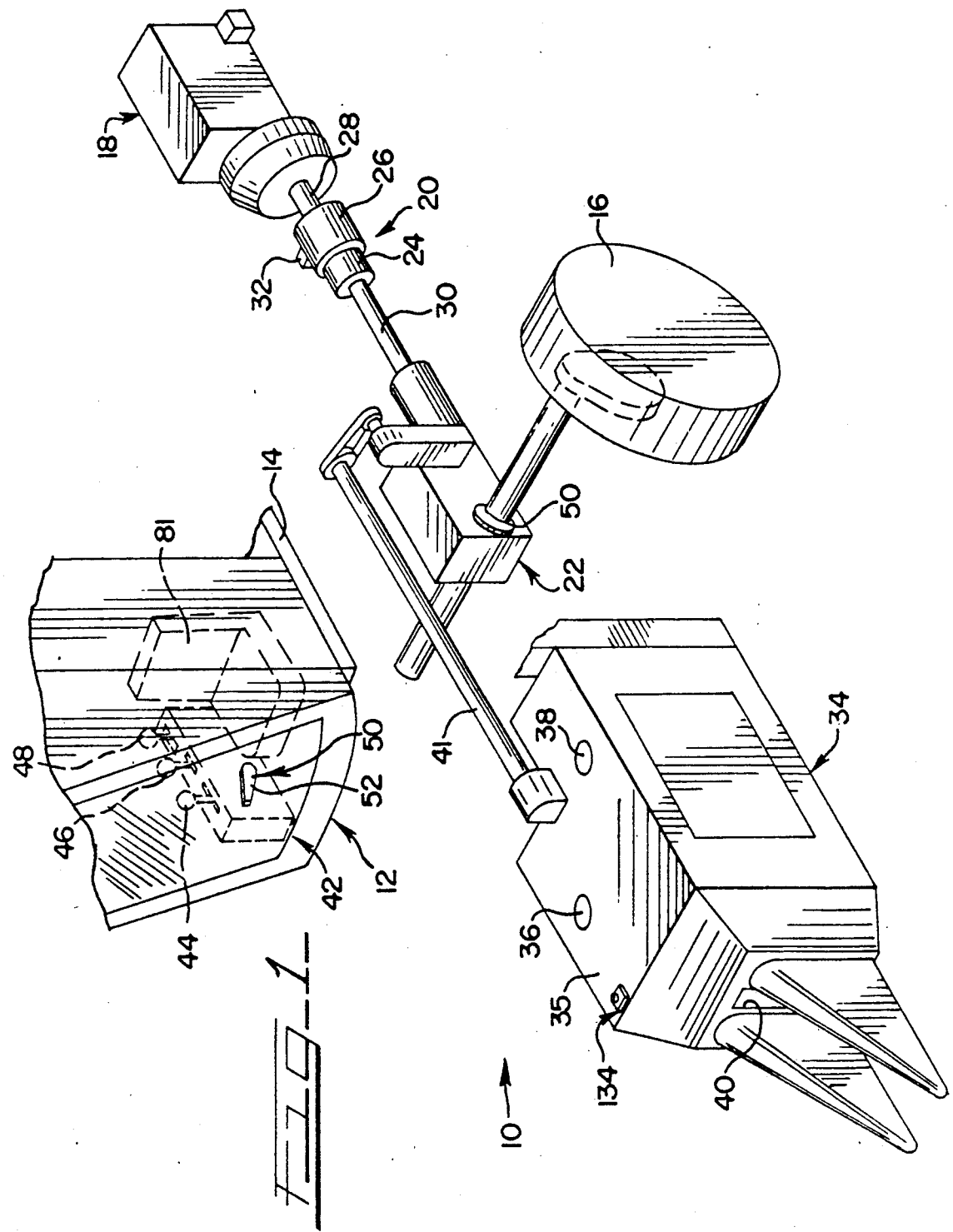
FIG. 1 is a schematic representation of an agricultural implement such as a cotton harvester with a harvesting unit arranged thereon.

While the present invention is susceptible of embodiment in various forms, there is shown in the drawings, and will hereinafter be described, a preferred embodiment of the invention with the understanding that the present disclosure is to be considered as an exemplification of the invention and is not intended to limit the invention to the specific embodiment illustrated.

Referring now to the drawings, wherein like reference numerals indicate like parts throughout the views, there is shown a cotton harvester which is depicted only fragmentarily and is seen as represented in its entirety in FIG. 1 by reference numeral 10. The cotton harvester 10 includes an operator station 12 arranged at the forward end of a mobile self-propelled chassis or frame 14. The frame 14 is supported for movement over a cotton field by wheels 16. A power train including an engine 18, an operable drive assembly 20, and a transmission 22 provide motive power to the harvester. It will be appreciated that the engine 18 is operated from the operator station 12 by a conventional throttle lever (not shown) which, depending upon its position, operates the engine at different speeds including engine shut-down. The operable drive assembly 20 connects the transmission 22 to the engine 18. A conventional ignition switch (not shown) is also provided at the operator station. The ignition switch provides voltage to the electrical system of the harvester.

The operable drive assembly 20 is preferably in the form of a conventional hydrostatic drive mechanism of the type utilized, for example, on J. I. Case Model No. 1800 cotton harvesters. Suffice it to say, the hydrostatic drive mechanism includes a motor 24 driven by a variable displacement pump 26 connected to the engine by a shaft 28. The motor 24 includes an output shaft 30. The variable displacement pump 26 typically includes a tiltable swashplate (not shown) which, in the preferred embodiment, is normally biased into a neutral position. The angular tilt of the swashplate controls the output of the motor 24. Pump 26 is connected to and controlled by a solenoid operated servovalve 32. When the servovalve 32 is energized, the hydrostatic drive mechanism works in a conventional manner. If for any reason, servovalve 32 is de-energized (power removed therefrom), the swashplate returns to its neutral position thereby disabling operation of the hydrostatic drive mechanism.

The transmission 22 can be conditioned to operate in a neutral mode or in a drive mode. As will be appreciated, the drive mode of operation of the transmission may include a plurality of gear ratios for developing different ground speeds for the harvester.

Although the present invention will be described in relationship to a cotton harvester, it is to be understood that the invention may also be utilized with other implements having driven units or equipment. In the preferred embodiment, and although only one is illustrated in FIG. 1, harvester 10 preferably includes a plurality of harvesting units 34 supported for vertical movement at a forward end of the harvester.

Each harvesting unit includes a housing 35 and a conventional harvesting mechanism for harvesting cotton from plants as the harvester is driven through the field. In the illustrated embodiment, the harvesting mechanism of each harvesting unit typically includes a pair of picker rotor assemblies 36 and 38 arranged alongside a plant passage 40 defined by housing 35.

The output shaft 30 of the hydrostatic drive mechanism 20 is connected to and operates both the transmission 22 and harvesting units 34. As illustrated, a drive shaft 41 connects the picker rotor assemblies of the harvesting units to the hydrostatic drive mechanism 20.

A control module 42 is located at the operator station 12. The control module 42 includes a manually shiftable operable control member 44, a manually shiftable drive control member 46, and a harvesting unit engagement member 48. As is conventional, the position of control member 44 regulates the tilt of the swashplate in the variable displacement pump 26 and, thereby, controls operation of the hydrostatic drive mechanism 20. The drive control member 46 conditions the transmission to operate in a neutral mode or in a drive mode depending upon the position of the control member 46. The harvesting unit engagement member 48 is used to mechanically engage and disengage the harvesting units from the hydrostatic drive mechanism to facilitate transportation of the harvester 10.

To inhibit movement of the harvester 10 when the transmission 22 is in neutral, harvester 10 is provided with a conventional manually operated emergency brake 50. The operation of brake 50 is regulated by a lever 52 provided at the operator station 12 of the harvester.

In accordance with the teachings of the present invention, FIG. 2 schematically represents an example of a control system 60 for controlling energization of servovalve 32 and, thereby, the operation of the hydrostatic drive mechanism 20. As illustrated, servovalve 32 is connected to the system ground of the harvester. Notably, the components of the control system 60 are schematically illustrated with the engine OFF and the ignition switch in an OFF position such that voltage is not applied to the control system.

In its preferred form, the control system 60 includes operator presence circuitry, gear selector circuitry, and bypass circuitry arranged in parallel with each other. As will be appreciated, independent completion or activation of any one or more of the operator presence, gear selector, or bypass circuitries will energize servovalve 32 and, thereby, enable the hydrostatic drive mechanism 20 to operate the transmission 22 and harvesting units 34 (FIG. 1).

In the illustrated embodiment, the control system 60 allows for operation of the harvester in a "Normal" or "Bypass" mode of operation and includes a power input terminal 70 connected to a voltage source V+. The operator presence circuitry of the control system is connected to the input terminal 70 and includes a seat switch 72. Seat switch 72 is connected to the input terminal 70 and to a mode switch 74. The mode switch 74 is a conventional manually operated, double throw, two-position switch which is preferably located in the cab region of the harvester and which includes conjointly movable contacts 76 and 78. The two positions or modes of switch 74 are: "Normal" and "Bypass". When switch 74 is in a "Normal" position or mode, contacts 76 and 78 are both open. As will be subsequently described, placement of switch 74 in a "Bypass" position activates an alarm means regardless of condition of any other switches in the control system.

The purpose of seat switch 72 is to monitor whether an operator is present at the operator station 12 and, more particularly, seated at the operator station. As illustrated, seat switch 72 includes normally open contacts 79 and 80. The seat switch 72 is connected to a seat 81 (FIG. 1) at the operator station 12. In the illustrated embodiment, the contacts 79 and 80 of switch 72 are closed when the operator is seated on the seat 81 and are open when the operator leaves the seat.

The control system 60 of the present invention includes logic circuitry 82 comprised of a series of relays 84, 86, 88, 90, 92, 94, 96 and 98. All of the relays 84 through 98 are schematically illustrated in a normally closed position.

Relays 84, 86 and 88 of logic circuitry 82 are connected to and operate in combination with each other and with the seat switch 72. Relay 84 is controlled by seat switch 72. Preferably, relay 84 is connected to terminal 80 of seat switch 72 and includes a movable contact 100 and terminals 102 and 104. As illustrated, terminal 104 is an open terminal.

Relay 86 acts as a latching relay which operates in response to relay 84 and includes a movable contact 106 and terminals 108 and 110. Contact 106 of latching relay 86 is connected to contact 100 of relay 84 to hydrostatic drive switch 120, and to relay 92. Terminal 108 of latching relay 86 is open. Terminal 110 is connected to terminal 102 of relay 84.

Relay 88 operates in response to relays 84 and 86. Relay 88 includes a movable contact 112 and terminals 114 and 116. Contact 112 of relay 88 is connected to V+. Terminal 114 is connected to the hydrostatic drive servovalve 32 through relay 90. Terminal 116 is open.

The purpose of the hydrostatic drive switch 120 is to enable the servovalve 32 of the hydrostatic drive mechanism in response to the operative position of the operable control member 44 and to reset the logic circuitry following an interruption of power to the servovalve 32 resulting from the operator leaving the operator station while the transmission is in neutral or otherwise. In a preferred form, the hydrostatic drive switch 120 is a two-position switch. As shown, hydrostatic drive switch 120 includes two contacts 122 and 124. Contact 122 of switch 120 is connected to the power input terminal 70. Contact 124 of switch 120 is connected to movable contacts 100 and 106 of relays 84 and 86, respectively, and to relay 92.

In the illustrated embodiment, the hydrostatic drive switch 120 is open when the operable control member 44 is positioned to operate the hydrostatic drive mechanism 20 in neutral or a disengaged mode and is closed when the operable control member 44 is positioned to engage the hydrostatic drive mechanism 20 in other than neutral.

Relays 90 and 92 of logic circuitry 82 are connected to and operate in combination with each other to regulate energization of servovalve 32 when the harvester is operated in a "Normal" mode of operation. As shown, relay 92 acts as a servovalve control relay and is connected to contact 124 of drive switch 120 and to relay 90 which acts as a latching relay. Control relay 92 includes a normally closed movable contact 126 and terminals 128 and 130. Movable contact 126 is connected to the power input terminal 70. Terminal 128 is connected to the servovalve 32 and to relay 90. Terminal 130 is an open terminal.

As shown, relay 90 is likewise connected to servovalve 32. Relay 90 acts as a latching relay that operates in response to control relay 92. Relay 90 includes a movable contact 132 and terminals 134 and 136. Movable contact 132 is connected to terminal 114 of relay 88. Terminal 134 is an open terminal. Terminal 136 is connected to servovalve 32.

The gear selector circuitry is connected to the power input terminal 70 and includes a neutral sensor or switch 140 and relay 94 which acts as a transmission neutral switch relay. Preferably, the neutral sensor 140 is mounted within the transmission 22 of the harvester for monitoring the condition of the transmission. In the preferred embodiment, sensor 140 is open when the transmission 22 is in gear, i.e., in a drive mode, and is closed when the transmission 22 is in neutral.

The neutral switch 140 is a conventional two-position switch which includes contacts 142 and 144. As illustrated, contact 142 of neutral switch 140 is connected to the power input terminal 70. Contact 144 of neutral switch 140 is connected to the transmission neutral switch relay 94 of logic circuitry 82.

The transmission neutral switch relay, 94 includes a movable contact 146 and two terminals 148 and 150. Contact 146 is connected to the power input terminal 70. Terminal 148 of the transmission neutral switch relay 94 is connected to contact 78 of mode switch 74. Terminal 150 of the transmission neutral switch relay 94 is connected to seat switch relay 84.

The bypass circuitry is connected to the power input terminal 70 and includes mode switch 74. The bypass circuitry is connected to servovalve 32 through the relays 96 and 98 of the logic circuitry 82 and through a remote switch 170.

In the illustrated example, the bypass circuitry includes an apparatus 154 for indicating the operative state of the mode switch 74. In a most preferred form of the invention, the indicator apparatus 154 is in the form of an electrically operated lamp 156 which is visible to the operator and readily provides an indication of the operative state of the bypass circuitry. Alternatively, an audible alarm 158 could be provided for indicating the status or state of mode switch 74.

Relay 96 of the logic circuitry 82 is connected and responds to outputs from a control apparatus 160 of the type disclosed in co-assigned and copending U.S. Pat. application Ser. No. 07/497,194, filed Mar. 22, 1990. Suffice it to say, the control apparatus 160 is connected to the system ground and generates an output signal over line 162 which is used to operate relay 96 in a first state as long as the engine 18 of the harvester operates below a predetermined range of engine speeds. In the illustrated embodiment, the predetermined range of engine speeds at which control apparatus 160 generates an output signal is between about 500 rpm and about 1300 rpm. When the engine speed rises above about 1300 rpm, the control apparatus 160 conditions the relay 92 to operate in a second state.

Relay 96 includes a movable contact 164 and terminals 166 and 168. The movable contact 164 of relay 96 is connected to the mode switch 74. Terminal 166 of relay 96 is an open terminal while terminal 168 is connected to relay 98 and to servovalve 32 of the hydrostatic drive mechanism 20 through the remote switch 170.

In the preferred embodiment, switch 170 is remotely mounted on the housing 35 of the harvesting unit 34 (FIG. 1). Alternatively, the switch 170 may be connected as by a tether to the remainder of the bypass circuitry. In a most preferred form, switch 170 is a conventional, normally open momentary push-button switch which includes normally open contacts 172 and 174. The normally open contact 172 is connected to terminal 168 of relay 96. Normally open contact 174 of switch 170 is connected to servovalve 32.

In a preferred form of the invention, relay 96 is connected to the system ground through an emergency brake switch 180 which is responsive to and monitors the operation of emergency brake 50 (FIG. 1). Switch 180 is of conventional construction and includes contacts 182 and 184. In the illustrated embodiment, the contacts 182 and 184 of emergency switch 180 are open when the emergency brake 50 is not applied and are closed when the emergency brake 50 is applied. Contact 182 is connected to relay 96 while contact 184 is connected to the system ground.

Relay 98 is connected and operates in response to relay 96. Relay 98 is also connected to V+ when switch 74 is in a "Bypass" position. Relay 98 includes a movable contact 186 and terminals 188 and 190. Movable contact 186 is connected to the system ground and to relays 84, 86, 88, 90, 92 and 94. Terminal 188 is an open terminal while terminal 190 is connected to indicator apparatus 156.

During operation of the harvester 10, either the operator presence circuitry, the gear selector circuitry, or the bypass circuitry will control energization of the servovalve 32 and thereby control enablement of the hydrostatic drive mechanism 20 depending upon prevalent conditions of the harvester. The operator presence circuitry will enable operation of the hydrostatic drive mechanism 20 when the operator is present at the operator station 12 as indicated by the operator being present in seat 81. The gear selector circuitry will enable the hydrostatic drive mechanism 20 when the transmission is in gear. As will be appreciated, the gear selector circuitry provides normal machine functions during field operation and road transport and energizes servovalve 32 to enable the hydrostatic drive mechanism to operate notwithstanding the operator shifting positions within or rising from the seat 81 at the operator station 12.

The bypass circuitry will enable operation of the hydrostatic drive under the following conditions: the transmission is in neutral as determined by the position of the drive control member 46, the engine 18 is operating below about 1300 rpm; and, the operable control member 44 is moved from a neutral position. To enable the hydrostatic drive mechanism through the bypass circuitry further requires the remote switch 170 to be manually closed. In a preferred form of the invention, the emergency brake 50 must be applied (effecting closure of switch 180) before the bypass circuitry will enable the hydrostatic drive to activate the harvesting units.

To begin a harvesting operation: the operator is present at the operator station 12 and normally seated in seat 81; the drive control member 46 is positioned to condition the transmission 22 in a neutral mode; the operable control member 44 is positioned to disengage the hydrostatic drive mechanism 20 and engagement member 48 is positioned to mechanically inhibit the picker rotor assemblies 36 and 3 from rotation; the mode switch 74 is in a "Normal" position or mode, and, the emergency brake 50 is released.

Under the above conditions, the operator presence circuitry will energize the servovalve 32 to enable operation of the hydrostatic drive mechanism 20. Power is applied to input terminal 70 from the voltage source V+ and flows to the mode switch 74. Because switch 74 is placed in a "Normal" position or mode, power is applied from mode switch 74, across the closed seat switch 72 to energize relay 84. Energization of relay 84 causes contact 100 to move from the position illustrated in FIG. 2 into contact with the open terminal 104.

Power is likewise applied from the power input terminal 70 across the normally closed contact 126 of relay 92 to energize relay 90 thereby causing contact 132 to shift from the position illustrated into contact with terminal 136.

With relay 88 deenergized, power V+ passes across the contact 112 to and across shifted contact 132 of latching relay 90 to energize servovalve 32 and enable operation of the harvester and harvesting units.

Upon energization of servovalve 32, the transmission can be engaged in a drive mode and the operable control lever 44 can be positioned to operate the harvesting units. Engagement of the transmission, opens switch 140 thus deenergizing relay 94 and thereby allowing power from input terminal 70 to flow across contact 146 to maintain relay 84 energized.

Positioning of the operable control member 44 to operate the harvesting units closes drive switch 120. Closure of drive switch 120 energizes relay 92 thereby causing contact 126 to shift into contact with open terminal 130. Because relay 90 is likewise connected to servovalve 32, relay 90 remains energized such that the movable contact 132 of relay 90 remains in a latched position with respect to terminal 136 and, thus, servovalve 32 remains energized notwithstanding energization of relay 92 following closure of drive switch 120.

During a harvesting operation, the bypass circuitry is inactive. During a harvesting operation, mode switch 74 is in a "Normal" position or mode thereby inhibiting the relays 96 and 98 from energizing valve 32. Because the emergency brake 50 is not applied, the bypass relay 96 is not connected to the system ground and, therefore, the signal from the control system 160 (indicative of the engine operating between about 500 and about 1300 rpms) is ineffective to move the movable contact 164 of relay 96. Thus, relay 96 is not shifted. Accordingly, indicator apparatus 154 is not grounded and, therefore, provides an indication that the mode switch 74 is conditioned for a "Normal" mode of operation.

As mentioned above, the operator often times desires a better view of the harvesting units 34 than that readily available and afforded from the seat 81 at the operator station 12. Therefore, it is common for the operator to raise off the seat to observe the performance of the harvesting units. Because the control system 60 of the present invention has parallel circuitry, the operator may reposition himself within the operator station 12 without interrupting power to the harvesting units regardless of the amount of time the operator is off the seat.

One salient feature of the present invention is that when the transmission is in gear, the control system ignores the presence of the operator at the operator station and maintains power to servovalve 32. As will be understood, when the operator raised off the seat 81 for a better view of the harvesting units, the seat switch 72 is opened. Notwithstanding the open seat switch 72, parallel and independent circuitry of the control system energizes the servovalve 32 and, thereby, enables the hydrostatic drive mechanism 20 to drive the transmission and harvesting units. Notably, when the transmission is in gear, the neutral switch 140 is open thereby deenergizing the transmission neutral switch relay 94, thus, providing an alternate power source for the servovalve 32. As illustrated, the alternate power source includes deenergized relay 94 which allows the power from input terminal to pass toward and maintain relay 84 in an open condition. As discussed above, the open condition of relay 84 deenergizes relay 88 and allows power to pass across contact 132 of latched relay 90 thereby enabling hydrostatic drive 20. As long as the transmission 22 remains in gear, circuitry independent of the operator presence circuitry is completed enabling operation of the servovalve 32 and thereby the harvesting unit 32.

Given the conditions noted above except that the transmission 22 is shifted into neutral, and with the operator seated at the operator station, the servovalve 32 will receive power and remain energized to enable the hydrostatic drive mechanism, and the harvesting units will be allowed to continue to operate.

Under these conditions, the closure of the seat switch 72 energizes the relay 84 causing movable contact 100 to move into an open position. Moving contact 100 of relay 84 into an open position deenergizes servovalve control relay 88 to maintain movable contact 112 in the position as illustrated and, thereby, energizing the valve 32 and enabling the hydrostatic drive mechanism 20.

When the transmission is in neutral and the operator rises from the seat 81 at the operator station, however, power to valve 32 is interrupted whereby shifting the hydrostatic drive mechanism into neutral. When the operator rises from the seat 81, seat switch 72 opens thereby opening the operator presence circuitry between switch 72 and relay 84. Thus, relay 84 is not energized through the operator presence circuitry or the gear selector circuitry and contact 100 of relay 84 shifts into the solid line position illustrated in FIG. 2.

The gear selector circuitry is ineffective to change the state of relay 84 under the above exemplary conditions. When transmission 22 is in neutral, the neutral switch 140 is closed. Closure of neutral switch 140 completes the gear selector circuitry extending from input terminal 70, across contacts 142, 144, and to the transmission neutral switch relay 94 to cause the movable contact 146 thereof to shift toward terminal 148 which is connected to an open terminal of switch 74 when the mode switch is in a "Normal" position or mode.

To prevent inadvertent operation of the harvester and harvesting units after the operator returns to the operator station, the control system of the present invention is configured to inhibit energization of servovalve 32 until the operator positively or manually resets the control system. As discussed above, when the operator leaves the operator station and, more specifically, seat 81, relay 84 is deenergized. Deenergizing relay 84 as by the operator leaving seat 81 also causes movable contact 106 of latching relay 86 to shift into contact with terminal 110 and shifts contact 112 of relay 88 into contact with open terminal 116. Therefore, and because of the shifted position of the latching relay 86, when the operator returns to the seat, harvesting unit operation will not be enabled until the operable control member 44 is moved to a neutral position. With the operable control member 44 in a neutral position, switch 120 is open thereby delatching relay 86 which resets the control system into that illustrated in FIG. 2.

As discussed above, when the transmission is in neutral and the operator leaves the operator station, the control system 60 inhibits operation of the harvester and harvesting units in a "normal" mode of operation. An intermittent short leading to or other forms of inadvertent power disconnection from the servovalve 32 will likewise cause the harvester and harvesting units to cease operation notwithstanding the position of either the operable control member 44 or drive control member 46. To prevent inadvertent operation of the harvester and harvesting units after the short or other form of power disconnection is corrected, the control system 60 is configured to require the operator to positively reset the control system following any interruption of power to servovalve. In the present embodiment, the control system is positively reset by requiring the operator to shift the operable control member 44 into a neutral position.

As noted above, upon engagement of the hydrostatic drive mechanism 20, hydrostatic drive switch 120 is closed thereby energizing relay 92 and causing contact 126 to move to open terminal 130. Because relay 90 is separately connected, however, to servovalve 32, power is delivered to the relay 90, thereby contact 132 remains in a latched position. An interruption of power to servovalve 32, such as by an intermittent short or otherwise, however, causes deenergization of relay 90 thus returning contact 132 to open terminal 134. Therefore, and because of the shifted open condition of the latching relay 90, when the power interruption is repaired, harvesting unit operation will not be enabled until the operator acts to positively reset the logic circuitry as by moving the control member 44 to a neutral position. With the operable control member 44 in a neutral position, switch 120 is open thereby deenergizing relay 92 which resets the latching relay 90 into position to enable servovalve 32. As will be appreciated, the logic design of the present invention furthermore inhibits inadvertent and undesired movement of the harvester when attempting to "jump start" a dead battery, at the starter solenoid positive terminal, with the transmission engaged and the operable control member 44 positioned to operate the harvester and harvesting units.

The bypass circuitry provides for controlled operation of the harvesting units during inspection and servicing operations. The bypass circuitry is configured to facilitate relatively low speed operation of the harvesting unit when the operator is away from the operator station and the transmission 22 is conditioned in a neutral mode of operation. To inhibit inadvertent movement of the harvester, brake 50 is applied during inspection and servicing of the harvesting unit. As mentioned above, bypass circuitry includes mode switch 74 which is moved into a "Bypass" position or mode when it is desired to operate the harvesting units in a bypass mode.

During inspection and servicing of the harvesting units, the operator presence circuitry is inactive or open. Shifting the mode switch 74 into a "Bypass" position or mode moves contact 76 into a position which energizes relay 98 and enables the alarm 158 and apparatus 154 and disables the operator presence circuitry.

With switch 74 in a "Bypass" position or mode, power is applied across the contact 78 and is delivered to relays 88, 86 and 84 whereby moving movable contacts 112, 106 and 100, respectively, into open positions, thereby, disabling the operator presence circuitry.

The gear selector circuitry is operative, however, during inspection and servicing of the harvesting unit 34 to apply power to mode switch 74. Because the transmission is in neutral during inspection and servicing procedures, the neutral switch 140 is closed. Accordingly, gear selector circuitry is completed from input terminal 70 across contacts 142 and 144 of switch 140 to the transmission neutral switch relay 94 causing movable contact 146 to shift into contact with terminal 148 thereby connecting the power input terminal 70 with movable contact 78 of mode switch 74. As will be appreciated, shifting the mode switch 74 into a "Bypass" position closes the contact 78.

During inspection and servicing of the harvesting units, the emergency brake 50 must be applied to inhibit inadvertent movement of the harvester. Applying brake 50 closes contacts 182 and 184 of switch 180 thereby connecting bypass relay 96 to the system ground. As long as the engine 18 is operated at relatively slow speeds (below about 1300 rpm), control system 160 will supply power over line 162 to the bypass relay 96 whereby shifting the movable contact 16 toward terminal 168. Accordingly, power delivered to contact 164 across closed contact 78 is delivered to the remote switch 170. The servovalve 32 and the hydrostatic drive mechanism are, thereafter, controlled through manual closure of the contacts 172 and 174 of the remote switch 170.

Should the engine speed exceed about a 1300 rpm or other suitable predetermined threshold, the power delivered to relay 96 from control operator 160 over line 162 will cease, thus deenergizing the relay 96 thereby returning contact 164 to the open terminal 166, thus disabling the bypass circuitry from energizing servovalve 32. Any other violations of the bypass conditions set forth above will likewise open or disable the bypass circuitry from operating servovalve 32.

As will be appreciated from an understanding of FIG. 2, when contact 164 of relay 96 is moved into contact with terminal 168, power is applied to and energizes relay 98. Energization of relay 98 causes movable contact 186 to shift into contact with terminal 190. Accordingly, power from the input terminal 70 is delivered across the indicator apparatus 154 and to terminal 190 which is now connected to the system ground as a result of contact 186 of relay 98 shifting from its normally open position. Completion of such a circuit will energize the indicator apparatus 154 and thereby provide a signal indicative of the mode switch 74 being moved into a "Bypass" position or mode.

With the present invention, activation of the harvesting unit can be effected through any of three electrical circuits. The logic provided by the relays 84, 86, 88, 90, 92, 94, 96 and 98 allows operation of the harvesting units in those situations where either the operator may carefully control operation of the harvesting units for inspection and servicing for when the operator is in an area remote from the harvesting units wherein the operator would not normally try to service or inspect the harvesting units. To reset any function of the control circuitry 60, the operator merely needs to shift the operable control member 44 into a neutral position.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A control system for an agricultural implement having a mobile frame with an operator station having an operator seat, a harvesting unit mounted on the frame, an engagable implement drive train for driving the implement across a field, an operable drive assembly for enabling operation of the harvesting unit and drive train, operable control means for conditioning said drive assembly to enable operation of said harvesting unit and drive train as a function of the operable control means position, drive control means for selectively operating said drive train in a neutral mode or in a drive mode as a function of the drive control means position, said control system comprising:

first operative means for sensing the presence of the operator in the operator seat and for providing a first signal when the operator is seated and a second signal when the operator is not present in the operator seat;

second operative means for sensing the position of said operable control means and for producing a third signal when said operable control means is positioned to condition said drive assembly to enable operation of said harvesting unit and drive train and a fourth signal when said operable control means is positioned to condition said drive assembly in a neutral mode;

third operative means for sensing the position of said drive control means and for producing a fifth signal when said drive control means is positioned to condition said drive train in a neutral mode and a sixth signal when said drive control means is positioned to condition said drive train in a drive mode; and logic control means connected and responsive to signals from each of said first, second and third operative means for controlling operation of said operable drive assembly such that when a third signal is received from said second operative means and a sixth signal is received from said third operative means the logic control means enables the operable drive assembly although the operator is away from the operator seat and disables the operable drive assembly from operating at least the harvesting unit when a fifth signal is received from said third operative means indicative of the drive train being shifted into a neutral mode of operation.

2. The control system according to claim 1 wherein said first, second and third operative means comprises first, second and third switches, forming part of first, second and third circuits arranged in parallel relation with each other.

3. The control system according to claim 1 further including valve means connected to and controlling operation of said operable drive assembly.

4. The control system according to claim 1 wherein said implement further includes emergency brake means for preventing movement of said harvested and wherein said logic circuitry is configured to enable said operable drive assembly in an alternative mode when a seventh signal is received by said logic control means indicative of application of said emergency brake means.

5. The control system according to claim 1 wherein said logic control means includes means for inhibiting continued operation of said operable drive assembly and thereby operation of at least said harvesting unit following disablement of said operable drive assembly until the operator positively resets the logic control means.

6. A control system for an agricultural implement having a mobile frame, driven by an engine operable at different speeds, an operator station, a harvesting unit mounted on the frame, a transmission connected to said engine for moving the implement across a field, a hydrostatic drive assembly for enabling operation of the harvesting unit and said transmission, operable control means for engaging and disengaging said drive assembly as a function of the operable control means position, drive control means for selectively conditioning said transmission into a neutral mode or into a drive mode as a function of the drive control means position, said control system comprising:

operator presence circuitry for normally disabling the hydrostatic drive assembly and thereby preventing operation of the harvesting unit when the operator leaves the operator station and the drive control means is selectively positioned such that the transmission is in a neutral mode while enabling the hydrostatic drive assembly and thereby allowing the harvesting unit to operate when the drive control is selectively positioned such that the transmission is in a neutral mode and the operator is present at the operator station;

gear selector circuitry operated independently of said operator presence circuitry for enabling said hydrostatic drive assembly as long as said transmission is operated in other than a neutral mode and notwithstanding the operator being away from the operator station: and bypass circuitry operated independently of said operator presence circuitry means and said gear selector circuitry for selectively enabling the hydrostatic drive to remotely operate the harvesting unit so long as the transmission has been shifted to a neutral mode.

7. The control system according to claim 6 wherein said operator presence circuitry includes means for monitoring when the operator leaves the operator station.

8. The control system according to claim 6 wherein said gear selector circuitry includes means for monitoring the position of said drive control means.

9. The control system according to claim 6 wherein said bypass circuitry includes manually operated means for selectively operating said harvesting unit remote from the operator station.

10. The control system according to claim 9 wherein said manually operated means comprises a first switch mounted proximate to the operator station for enabling operation of said bypass circuitry and a second switch arranged in series with said first switch, said second switch being controlled from a location remote from said operator station.

11. The control system according to claim 6 wherein said bypass circuitry further includes means for inhibiting operation of said harvesting unit under the control of said bypass circuitry to a predetermined range of engine speeds.

12. The control system according to claim 6 wherein said bypass circuitry further includes means for monitoring application of an emergency brake or the implement.

13. The control system according to claim 6 further including means for inhibiting continued operation of said harvesting unit and said transmission following disablement of the hydro-static drive assembly until the operator positively repositions the operable control means to release said inhibiting means.

14. A method for controlling a cotton harvester having a mobile frame with an operator station having an operator seat, a harvesting unit mounted on the frame, an engagable drive train for driving the harvester across a field, an operable drive assembly for enabling operation of the harvesting unit and drive train, operable control means for conditioning said drive assembly to enable operation of said harvesting unit and drive train as a function of the operable control means position, drive control means for selectively operating said drive train in a neutral mode or in a drive mode as a function of the drive control means position, said method comprising the steps of:

sensing the operator's presence at the operator station and providing a first signal when the operator is seated and a second signal when the operator is not seated in the operator seat;

sensing the position of said operable control means and providing a third signal when said operable control means is positioned to condition said drive assembly to enable operation of said harvesting unit and drive train and a fourth signal when said operable control means is positioned to condition said drive assembly in a neutral mode;

sensing the position of said drive control means and providing a fifth signal when said drive control means is positioned to condition said drive train in a neutral mode and a sixth signal when said drive control means is positioned to condition said drive train in a drive mode; and controlling operation of said operable drive assembly as a function of said signals such that when a third signal is provided indicative of said operable control means being positioned to engage said drive assembly and a sixth signal is provided indicative of the drive control means being positioned to operate said drive train in a drive mode, the operable drive assembly will be enabled to drive the harvesting unit and drive train although the operator is away from the seat and when a fifth signal is provided indicative of the drive control means being shifted into a neutral mode of operation will disable the drive assembly and thereby inhibit operation of said harvesting unit.

15. The method according to claim 14 further including the steps of:

operating said harvesting unit from a location remote from said operator station.

16. The method according to claim 15 further including the step of:

enabling operation of said harvesting unit from a location remote from said operator station as long as said engine is operated within a predetermined range of speeds.

17. The method according to claim 14 further including the step of:

inhibiting continued operation of said harvesting unit and drive train following disablement of said drive assembly until the operator positively acts to condition the harvester for continued operation.

* * * * *